Jan. 14, 1930. W. B. HODGE 1,743,668
HUMIDIFIER
Filed Aug. 23, 1928 2 Sheets-Sheet 1

INVENTOR
WILLIAM B. HODGE
BY Benj. T. Rauber
his ATTORNEY

Jan. 14, 1930.  W. B. HODGE  1,743,668
HUMIDIFIER
Filed Aug. 23, 1928  2 Sheets-Sheet 2

INVENTOR
WILLIAM B HODGE
BY
his ATTORNEY

Patented Jan. 14, 1930

1,743,668

UNITED STATES PATENT OFFICE

WILLIAM B. HODGE, OF CHARLOTTE, NORTH CAROLINA

HUMIDIFIER

Application filed August 23, 1928. Serial No. 301,483.

My present invention relates to an apparatus for humidifying air, and more particularly to an apparatus whereby air may be brought to any desired degree of humidity, or may be super-saturated, and may then be distributed either in the immediate vicinity of the apparatus, or may be transported to some distance therefrom for distribution in rooms or apartments.

Among the objects and features of my invention are: To provide an apparatus whereby air may be circulated from an atmosphere to a confined space, in which it is brought to the desired degree of humidity or of super-saturation, and then returned to, and distributed or disseminated throughout, the atmosphere; to provide an apparatus for supplying saturated or partly saturated air without carrying into the atmosphere particles of water too large to completely evaporate before settling from the atmosphere; or for supplying super-saturated air, or air that, in addition to being saturated, carries finely divided particles of water, and to so distribute such super-saturated or water carrying air as to cause complete vaporization while said particles of water are in suspension; to provide an apparatus of the type indicated above in which the moistened or conditioned air may be readily warmed or heated before being distributed through the atmosphere to be conditioned; to provide an apparatus which provides a uniform distribution of moisture in a carrying current of air; and to provide an apparatus for circulating and humidifying air which protects the air circulating means from direct contact with the moisture while it, at the same time, ensures against leakage of unvaporized or unvaporizable water particles from the apparatus to surrounding objects.

With these and other objects in view, the invention comprises the apparatus described and set forth in the following specification and claims.

The various features of the invention are illustrated in the accompanying drawings, in which.

Figure 1:
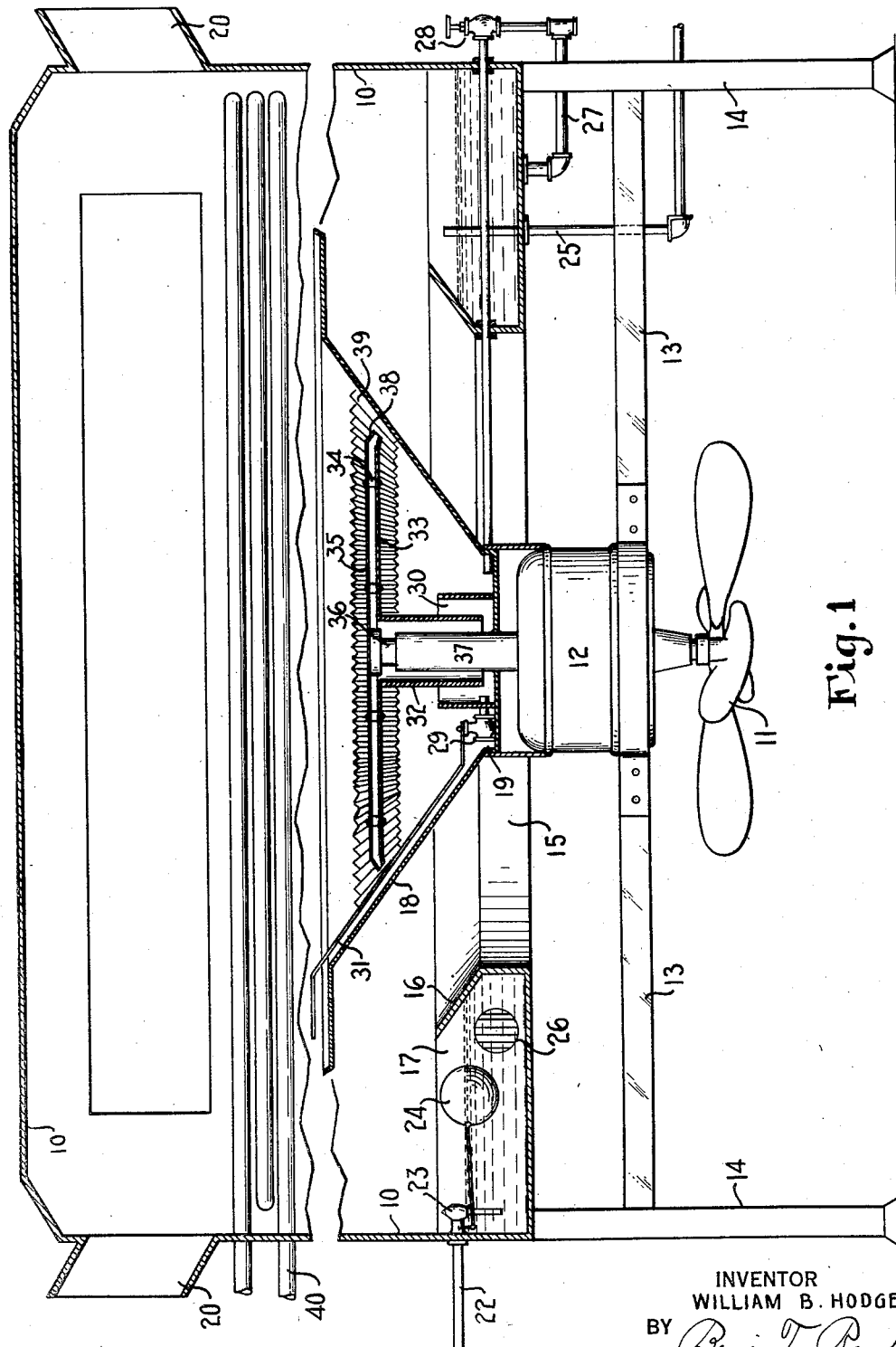
Fig. 1 is a vertical sectional view of an apparatus embodying a preferred form of the invention.
Figure 2:
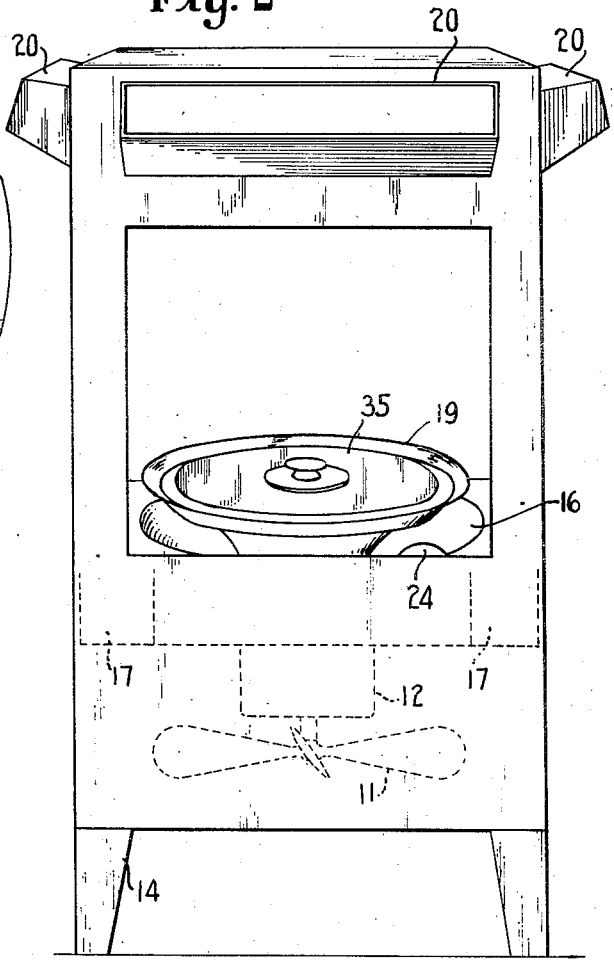
Fig. 2 is a front elevation of the apparatus, a panel being removed to show the interior construction.

In my present invention air is drawn from an atmosphere and propelled upwardly in a uniform, annular stream. Water for humidifying the stream of air is centrifugally atomized and suspended uniformly in the annular stream of air and thence carried upwardly and distributed in an outward horizontal stream into the surrounding atmosphere. The air carrying the atomized water may be heated before being distributed into the atmosphere. A fan and its motor for propelling the air upwardly is positioned beneath the atomizing device and propels the air through a central passage in an annular drip and water supply pan. Positioned centrally of this passage, and extending thereabove, is a water containing pan which, with the inner edge of the drip and water supply pan, forms an annular passage for the air. Water is continuously drawn upwardly from the lower part of this pan by centrifugal action, spread in a thin film and projected against a corrugated disintegrating surface adjacent the inner, upper edge of the pan, and is thereby broken into a fine mist uniformly distributed about the edge of the pan and in position to be taken up by the upwardly passing air. Any particles too large to remain suspended in the air will fall back into the pan or into the drip and water supply tank. The supply of water may be so controlled as to bring the air to the required degree of humidity or saturation, or to leave residual, unvaporized particles of water in the air after being saturated.

Referring more particularly to the accompanying drawings, a supply of air is drawn beneath, and propelled upwardly, into a casing 10 by means of a fan 11 depending from, and rotated by, a motor 12 supported by means of rods 13 from the supporting legs 14 of the casing. The upwardly propelled stream of air passes through an annular passage 15 formed between the upwardly and outwardly flared inner wall 16 of a drip and water supply tank 17 extending from the lower, inner edge of the casing 10 and an outwardly flaring wall 18 and a central atomizing pan 19. This atomizing pan may be of the same construction as that shown in patent #1,626,668, or of other suitable construction.

Figure 3:
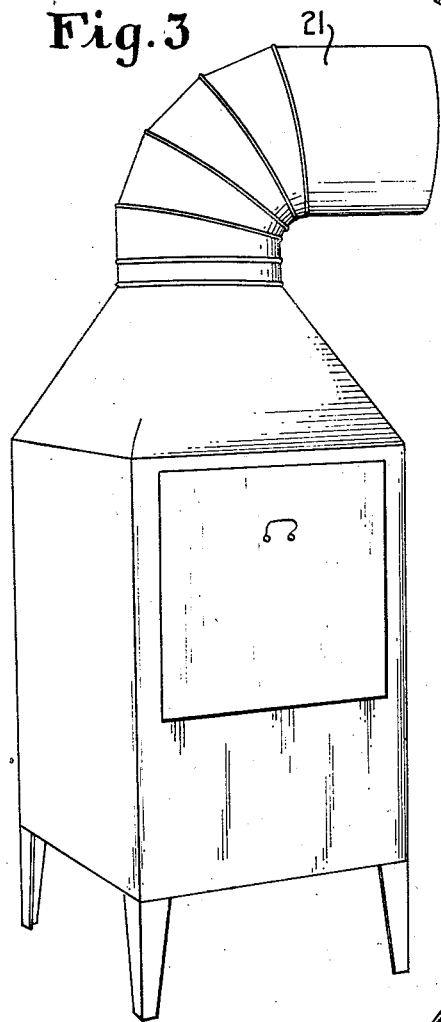
Fig. 3 is a front elevation of a modified form of the apparatus for use in supplying apartments at some distance from the apparatus, or for supplying and distributing super-saturated air throughout a surrounding atmosphere.
Figure 4:
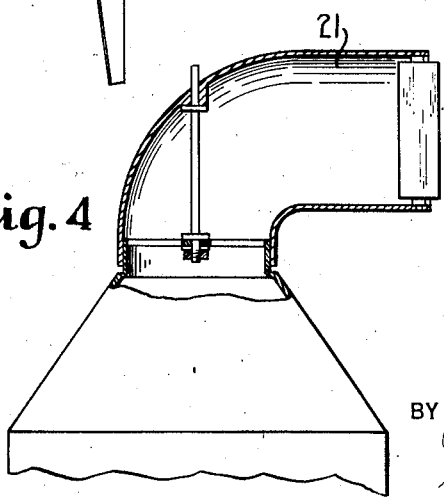
Fig. 4 is a detail sectional view of a modification of the apparatus shown in Fig. 3, to create a rotational movement in the distributing outlet.

Through the above arrangement there is created an upwardly flowing, annular blast of air uniformly distributed about the walls 18 of the pan 19. As this blast of air flows upwardly between the upper edge of the wall 18 and the inner surface of the casing 10 it receives a mist of water formed uniformly around the upper edge of the pan. From the upper edge of the wall 18 the air flows at a reduced speed upwardly through the casing, and outwardly through side vents 20 in the upper part of the casing 10 or, as shown in Fig. 3, through a central funnel 21 for distribution to distant apartments. As the upper edge of the wall 18 of the humidifying pan overlaps the inner wall of the drip and supply tank 17, any particles of water that are too heavy to be supported in the relatively slow moving current of air above the humidifying pan will fall either into the pan or into the drip and supply tank. As the outer wall of the supply tank is a continuation of the wall of the casing 10, any moisture that may condense on the casing will drip back into the annular supply tank. In this way, leakage or dropping of water downwardly from the casing 10 is entirely prevented and there is no opportunity whatever for the splashing or wetting of the motor 12, or fan 11, or other objects beneath the casing 10.

Water for humidifying the air is supplied to the annular tank 17 through a supply pipe 22 and valve 23, controlled by a float 24. An overflow pipe 25 is provided to prevent any flooding of the apparatus. The water within the drip and supply tank 17 may be heated, if desired, by means of a suitable electric heater 26. From the tank 17 water is supplied through a pipe 27 and control valve 28, operated either manually or automatically, to the humidifying pan 19. The water entering the pan 19 is admitted through a control valve 29 to an inner compartment 30, from whence it is drawn upwardly and atomized about the upper edge of the pan. The rate of flow of water through the valve 29 may be manually controlled through a handle 31 extending from the valve to the outer edge of the wall 18 of the pan. From the inner compartment 30, water is drawn upwardly in a uniformly distributed film on the inner surface of a vertical, rotating tube 32 which may either be of tubular construction or, preferably, slightly expanding upwardly. As it reaches the upper edge of the tube 32, the film of water is centrifugally impelled over the surface of a horizontal, rotating plate 33, from the inner edge of which the vertical tube 32 depends. The horizontal plate 33 is supported by means of bolts and spacers 34 in closely spaced position beneath an upper, rotating plate which is, in turn, supported on the upper end of a vertical shaft 36 extending from the motor 12 upwardly through a collar 37 sealed in the bottom of the pan 19. As the water, flowing outwardly between the horizontal plates 33 and 35, passes the outer edge of the plate 33, it strikes a downward extension 38 of the plate 35 which ensures the formation of a thin, uniform sheet of liquid directed against corrugations 39 extending around the inner surface of the wall 18. As the film of water strikes the corrugations 39, it is broken up into fine particles which are thrown upwardly in a fine mist and are drawn into the current of air passing the upper edge of the wall 18. Any particles too large to float readily into the atmosphere above the corrugations 39, settle back into the pan and return to the compartment 30 to be again atomized.

It will be obvious that in the above apparatus and method, the air is sprayed into a relatively thin, uniform stream and that the particles of water to be carried thereby, or vaporized thereinto, are similarly sprayed uniformly over an area closely contiguous to that of the passing current of air so that there is a uniform distribution of the water particles into the air.

It will be evident, also, that by suitable control of the valves 28 and 29, the rate of atomizing the water relative to the drive of the fan 11 may be varied or proportioned to obtain any desired humidity or to saturate the air and provide an excess of fine particles of moisture. These residual particles of moisture may be vaporized by increasing the temperature of the air by means of steam coils 40 in the upper part of the casing 10 or, the saturated air with the finely divided particles of water, may be distributed into the surrounding atmosphere in such a manner as to cause rapid evaporation of the minute particles of water. This may be effectively accomplished by rotatably mounting the funnel 21, shown in Fig. 3, on a vertical axis and providing directing vanes, as indicated in Fig. 4, whereby the outward movement of the air will cause the funnel to rotate, throwing the super-saturated air from the casing 10 in a rotating stream into the atmosphere, so that this stream will be projected into a continuously renewed less humid atmosphere.

As changes of construction could be made within the scope of my invention, it is intended that all matter contained in the above description or shown in the accompanying drawings shall be interpreted as illustrative and not in a limiting sense.

Having now described my invention, what I claim as new and desire to secure by Letters Patent is:

1. Apparatus of the type described which comprises a casing having an inlet and an outlet, a drip and water supply tank having a passage upwardly therethrough, a pan mounted centrally of said passage and having side walls flaring outwardly above said drip and water supply tank, to form an outwardly flaring annular passage therewith, means in said pan for centrifugally drawing water from said pan and atomizing it against the inner surface of said flaring walls, and a fan for generating a current of air upwardly between said pan and said drip and supply tank.

2. Apparatus of the type described which comprises a casing having an inlet and an outlet, a drip and water supply tank having a passage upwardly therethrough, a pan mounted centrally of said passage and having side walls flaring outwardly above said drip and water supply tank, to form an outwardly flaring annular passage therewith, means in said pan for centrifugally drawing water from said pan and atomizing it against the inner surface of said flaring walls, a fan for generating a current of air upwardly between said pan and said drip and supply tank, and heating coils above said pan.

3. Apparatus of the type described which comprises a casing having an inlet and an outlet, a drip and water supply tank in said casing having a vertical passage therethrough, a pan mounted centrally of said passage and having side walls flaring outwardly above said drip and water supply tank to form an outwardly flaring annular passage therethrough, means in said pan for centrifugally drawing water from said pan and atomizing it against the inner surface of said flaring walls, an electric heating element in said drip and supply tank, and a fan for generating a current of air upwardly between said pan and said drip and supply tank.

4. Apparatus of the type described which comprises a casing having an inlet and an outlet, a drip and water supply tank having a vertical passage therethrough, a pan mounted centrally of said passage and having side walls flaring outwardly above said drip and water supply tank to form an outwardly flaring annular passage therewith, means in said pan for centrifugally drawing water from said pan and atomizing it against the inner surface of said flaring walls, a fan for generating a current of air upwardly between said pan and said drip and supply tank, and a control valve for supplying water to said centrifugal means.

5. Apparatus of the type described which comprises a vertical humidifier casing having vent openings at its upper portion, a water supply tank in the lower part of said casing having a vertical air inlet opening therethrough, a centrifugal means for atomizing water mounted centrally of said inlet opening and out of direct contact with air passing therethrough, and means to create a draft of air through said vertical opening uniformly about said atomizing means.

6. Apparatus of the type described, which comprises a vertical humidifier casing having vent openings in its upper portion, a water supply tank in the lower part of said casing extending inwardly from the lower end of said casing to form a central air inlet opening therethrough, a centrifugal means to atomize water centrally of said inlet opening out of direct contact with air passing therethrough, and means to create a draft through said central opening uniformly about said centrifugal atomizing means.

7. Apparatus of the type described which comprises a vertical humidifier casing having a rotating, horizontally directed vent opening at its top, a water supply tank extending inwardly from the lower part of said casing to form a central air inlet passage therethrough, centrifugal atomizing means mounted centrally of said inlet opening, and means to create a draft upwardly through said central opening and about said atomizing means.

8. Apparatus of the type described which comprises a vertical humidifier casing having a vent at its top, a water supply tank extending inwardly from the lower edge of said casing to form a central upward air inlet opening therethrough, centrifugal means for atomizing water centrally of said inlet opening and shielded from the path of air passing therethrough, and means for creating an upward draft of air through said casing.

9. Apparatus of the type described which comprises a vertical humidifier casing having vent openings at its upper part, a water supply tank extending inwardly from the lower part of said casing to form a central air inlet opening therethrough, centrifugal means for atomizing water centrally of said inlet, and for shielding said atomized water from the direct path of air passing therethrough, a fan beneath said inlet opening, and a driving motor for said fan and said atomizing means positioned beneath said atomizing means.

10. Apparatus of the type described which comprises a vertical humidifier casing having vent openings in its upper part, a water supply tank extending inwardly from the lower part of said casing to form a central air inlet opening therethrough, a humidifying pan located centrally of, and extending above, said inlet opening, a motor beneath said pan, a fan beneath said motor, means for supplying water from said supply tank to said pan, and means driven by said motor to draw water upwardly from said pan and atomize it against the inner surface of said pan.

11. Apparatus of the type described which comprises a vertical casing having vent openings in its upper end and having its lower walls extended inwardly to form a vertical inlet passage and a drip and supply tank, an atomizing pan mounted centrally of said opening and having outwardly flaring walls overlapping and spaced above the inner edge of said drip and water supply tank, means for drawing water from said pan and atomizing it by impact against the inner walls of said pan, a motor beneath said pan for driving said atomizing means, a fan beneath said motor, and means for supplying water to said tank and other means to supply water from said tank to said pan.

In testimony whereof I affix my signature.

WILLIAM B. HODGE.